(12) United States Patent
Lundin et al.

(10) Patent No.: US 11,406,987 B2
(45) Date of Patent: Aug. 9, 2022

(54) SYSTEM AND A METHOD FOR SEPARATING PIECES HAVING A SECOND DENSITY FROM GRANULAR MATERIAL

(71) Applicant: Lvndin o Lvndin AB, Målsryd (SE)

(72) Inventors: Joakim Lundin, Tystberga (SE); Jonas Lundin, Tystberga (SE)

(73) Assignee: Lvndin o Lvndin AB, Målsryd (SE)

( * ) Notice: Subject to any disclaimer, the term of this patent is extended or adjusted under 35 U.S.C. 154(b) by 0 days.

(21) Appl. No.: 16/980,184

(22) PCT Filed: Mar. 8, 2019

(86) PCT No.: PCT/EP2019/055799
§ 371 (c)(1),
(2) Date: Sep. 11, 2020

(87) PCT Pub. No.: WO2019/175034
PCT Pub. Date: Sep. 19, 2019

(65) Prior Publication Data
US 2021/0016291 A1    Jan. 21, 2021

(30) Foreign Application Priority Data

Mar. 13, 2018  (SE) .................................. 1850275-7

(51) Int. Cl.
*B03B 5/40*    (2006.01)
*B03B 9/00*    (2006.01)

(52) U.S. Cl.
CPC ................. *B03B 5/40* (2013.01); *B03B 9/00* (2013.01); *B03B 2005/405* (2013.01)

(58) Field of Classification Search
CPC .... B03B 5/36; B03B 5/38; B03B 5/40; B03B 5/62; B03B 5/623; B03B 5/626;
(Continued)

(56) References Cited

U.S. PATENT DOCUMENTS

| | | |
|---|---|---|
| 2,420,180 A | 5/1947 | Laughlin |
| 3,537,581 A | 11/1970 | Baummer |
| (Continued) | | |

FOREIGN PATENT DOCUMENTS

| | | |
|---|---|---|
| CA | 1160978 A | 1/1984 |
| CA | 1296673 C1 | 3/1992 |
| (Continued) | | |

OTHER PUBLICATIONS

First Office Action (OA1) dated Aug. 30, 2021 in related CN case CN Applica0on No. 201980022541.5 The CN action identified the references disclosed in this IDS. the examiner did not make any objec0ons regarding to novelty or inventive step.

(Continued)

*Primary Examiner* — Gene O Crawford
*Assistant Examiner* — Muhammad Awais
(74) *Attorney, Agent, or Firm* — Welsh IP Law LLC

(57) ABSTRACT

The invention relates to a system and method for separating pieces having a second density (9c) from granular material. The system includes a separation tank (2) comprising a first side wall (12) provided with a tank outlet (6), a bottom (7), a pipe (4) defining a channel (3a) for allowing a slurry to enter the tank (2). A pipe outlet (4b) is spaced apart from the tank outlet and arranged vertically below the outlet (6). The separation tank (2) comprises a trap (5) for collecting said pieces. A separation chamber (8a) is arranged in liquid communication with the pipe outlet to allow slurry to enter the separation chamber. The pipe outlet is in a lower third of the separation tank facing the bottom of the tank so that slurry flows vertically through the pipe outlet towards the bottom causing a turbulent flow of the slurry in the tank.

16 Claims, 5 Drawing Sheets

(58) Field of Classification Search
CPC ..... B03B 9/00; B03B 2005/405; B03B 4/005; B03B 4/02; B03B 4/06; E21C 41/00; B01D 21/00
USPC .......................................... 209/173, 466, 467
See application file for complete search history.

(56) References Cited

U.S. PATENT DOCUMENTS

| | | | |
|---|---|---|---|
| 4,352,733 A | 10/1982 | Hibbard | |
| 5,287,975 A | 2/1994 | Chumley | |
| 6,244,446 B1 | 6/2001 | Schmittel | |
| 8,599,032 B2 * | 12/2013 | Smith | B07B 1/28 340/657 |
| 8,869,986 B2 * | 10/2014 | Bailey | B07B 1/4609 209/233 |
| 9,855,563 B2 | 1/2018 | Sasso | |

FOREIGN PATENT DOCUMENTS

| | | |
|---|---|---|
| CN | 101291714 A | 10/2008 |
| CN | 102059005 A | 5/2011 |
| CN | 102197001 A | 9/2011 |
| CN | 102596769 A | 7/2012 |
| CN | 102892477 A | 1/2013 |
| CN | 103002987 A | 3/2013 |
| FR | 2487699 A1 | 2/1982 |
| GB | 969223 A1 | 9/1964 |
| GB | 2407051 A1 | 4/2005 |
| WO | 2010138094 A1 | 12/2010 |

OTHER PUBLICATIONS

International Search Report and Written Opinion of the International Searching Authority Application No. PCT/EP2019/055799 dated Jul. 23, 2019 13 pages.
Office action SE PTO dated Sep. 19, 2018 6 pages.
Office action Colombia Patent office (CO PTO) dated May 25, 2022 in related case.
Office action Uzbekistan Patent office (UZ PTO) dated Apr. 10, 2022 in related case.
Office action Chile Patent office (CL PTO) dated Mar. 31, 2022.
Search Report Chile Patent Office (CL PTO) dated Mar. 31, 2022.

* cited by examiner

SYSTEM AND A METHOD FOR SEPARATING PIECES HAVING A SECOND DENSITY FROM GRANULAR MATERIAL

TECHNICAL FIELD

The present invention relates to a system comprising a separation tank and a method for separating pieces having a second density from granular material using the system.

BACKGROUND

Today, mining is an energy and water consuming business. Rocks and other naturally occurring material are being milled into granular material with a diameter that can be handled by the mining machinery. The granular material is being washed and cleaned, while being transported on conveyer belts towards a separation machine. In the machine, the valuable products, such as heavy pieces or heavy metal pieces are being separated from the rest of the material. All machinery consume gas (diesel mostly) and a lot of water is needed for the cleaning and separation process. In remote areas, diesel and water supply may be a problem. To ensure that enough water is present during the mining process, ponds are being created. The construction of these ponds can have serious impact on the local environment, because, mostly, water is being drained from rivers or other sources, such that wild life in the surroundings of the mine is affected by the change in water levels. Furthermore, in the winter, the water freezes, which restricts mining activities to the warmer months of the year.

The diesel consumption has an impact on the environment per se. It has also an impact on the costs for mining.

It would thus be advantageous if mining could be performed with reduced amounts of gas or diesel and without the need for excess amounts of water. There is a need for a mining process that consumes less energy and has a lower or no impact on the environment and which process can be performed even in cold winter conditions.

Recycling becomes more and more important. Many metals are present in or on plastic material that are dumped in regular waste from households or industries, for example credit cards. Also, most electrical apparatus, computers and old batteries comprise metals that are worth recycling. The amounts of metals are often low, which makes recycling these metals from waste an expensive operation. In the future, deficiencies of critical metals are feared. Such deficiencies may be prevented by a system or method, whereby the metals can be recovered from waste in an economically and environmentally favorable manner.

There is thus a need for a system that can separate pieces having a second density from a bulk granular material. The pieces may be metal pieces, but may likewise be stone, plastic or wood pieces.

GB969223 discloses a system for recovering heavy-density liquids from their mixtures with solids. In this system, the floating material is being separated from water so that the floating material can be re-used. Pieces with increased density are not separated in a lower tank by settlement using gravity. Further, there is no flow of slurry through a lower tank. Instead, the liquid in a lower tank is stagnated to stratify the liquid into two phases. The system is not adapted for extraction or recovery of heavy pieces, such as heavy metals.

CA1296673 discloses a system for separating mixtures of particulate materials according to particle density. The process comprises passing the particulate materials through a series of counter flow separation units. Separation of particulate pieces is enhanced using different flow rate, which are caused by altering diameters of the tanks. The tanks 4 and 17 in FIG. 3 are tanks for recirculating the flow of water. This process is complex, energy consuming and not adapted for extraction or recovery of heavy pieces.

U.S. Pat. No. 969,223 discloses a method and an apparatus for separating heavy density liquid from solid matter comprising a mixing vessel for mixing the heavy density liquid and solid matter with water and a separation vessel for allowing stratification of the mixture into an aqueous phase in an upper portion of the separation vessel, and a heavy aqueous phase in a lower portion of the separation vessel and means for withdrawing water with suspended solid matter from the upper aqueous phase and the heavy density liquid from the lower phase.

SUMMARY

It is an aim of the present invention to at least partly overcome the above mentioned problems, and to provide an improved system and method for separating pieces having a second density from granular material.

The present disclosure aims to provide a system and a method for separating pieces having a second density in a more environmentally friendly way and with less water and energy consumption.

This aim is achieved by a system for separating pieces having a second density from granular material as defined in claim 1.

The system includes a separation tank comprising a first side wall provided with a tank outlet, a bottom, a pipe defining a channel arranged to allow a slurry of water, a floating material having a first density, which is less than the second density, granular material and the pieces having the second density, to flow into the separation tank, wherein the pipe has a pipe outlet spaced apart from the tank outlet in a horizontal and vertical direction, and the tank outlet is arranged above the pipe outlet in the vertical direction, a separation chamber including the tank outlet and arranged in liquid communication with the pipe outlet, and a trap for collecting pieces having the second density, arranged at the bottom of the tank. The pipe outlet is located in a lower third of the separation tank, and the pipe outlet is facing the bottom of the separation tank so that the slurry flows through the pipe outlet in a substantially vertical direction towards the bottom to cause a turbulent flow of the slurry in the separation tank.

With the term "pipe outlet" is meant an outlet opening of the pipe. The pipe inlet is located in an upper end of the pipe and the pipe outlet is located in a lower end of the pipe.

With the term "the pipe outlet is located in a lower third of the separation tank" is meant that the distance between the pipe outlet and the bottom of the separation tank is ⅓ or less of the height of the separation tank.

With the term "arranged in liquid communication with" is meant that there is at least one opening between the pipe outlet and the separation chamber so that liquid can flow between the pipe outlet and the separation chamber in at least one direction.

By positioning the outlet of the pipe no higher than in the lower one third of the separation tank, gravity can be used for the separation of the heavy pieces. No gas or excess of cleaning water is needed. This reduces costs and impact on the environment. The closer the pipe outlet is to the bottom of the separation tank; the more turbulence is caused at the bottom of the separation tank. This turbulence improves separation and settling of the pieces having a second density at the bottom of the separation tank. This facilitates separation of the heavy pieces from the slurry at the bottom of the separation chamber. Due to the differences in density and weight, the heavy pieces will remain at the bottom of the separation chamber, while lighter and less dense material will float from the outlet of the pipe through the separation tank.

The slurry, as a mixture of granular material, pieces having a second density, water and a floating material having a first density, is received in the separation tank by using an upper tank or by using a pump. The pressure of the slurry may be regulated using a valve. The slurry enters the separation tank through the pipe, which has an outlet located in a lower third of the separation tank. Positioning the tank outlet above the pipe outlet in the separation tank in relation to a vertical axis extending along a central axis of the separation tank, forces the flow of the slurry in an upwards direction, which improves separation of the heavy pieces from the slurry that flows through the separation tank. The slurry has to move from the lower part or bottom of the separation tank towards the upper part or ceiling of the separation tank.

During this movement of the slurry, in combination with the turbulence and the change in flow direction and flow rate, the heavy pieces are being separated from the slurry by gravity. The heavy pieces sink to the bottom of the separation tank to be collected in the trap.

Due to the fact that the pipe outlet is facing the bottom of the separation tank, the slurry enters the separation tank in a direction perpendicular to the bottom of the separation tank.

When the slurry leaves the pipe outlet, the direction of the slurry changes from a substantial vertical direction to a substantial horizontal direction due to the short distance between the pipe outlet and the bottom of the separation tank. Also, the flow rate of the slurry decreases when entering the separation tank from the pipe outlet. This is partly due to the increased volume of the separation chamber compared to the volume of the channel defined by the pipe. These changes in flow rate and direction cause a turbulence in the flow in the separation tank near the pipe outlet. This turbulence in the flow of the slurry improves separation of the pieces having a second density from the slurry. The pieces having a second density will settle at the bottom of the separation chamber. Separation of the pieces having a second density is further enhanced by gravity. The pieces having a second density remain at a bottom of the separation chamber, while the rest of the liquid (preferably slurry with a lower content of pieces having a second density, flows at a lower flow rate compared to the flow rate in the pipe. The slurry rises in the separation chamber towards the tank outlet. The tank outlet is positioned in the proximity of the ceiling of the separation tank, preferably the distance between the tank outlet and the bottom of the separation tank is ⅔ or more of the height of the separation tank. Also, this slow rising of the liquid in the separation chamber enhances separation of the pieces having a second density.

One advantage of the system of the disclosure is the scalability. The system can be used at a small scale for exploration activities or at a larger scale at a mining site or at recycling plants. As long as the flow rate of the slurry into the separation tank causes a collision or turbulence when entering the separation tank by change of flow rate and change in direction of flow, the pieces having a second density will (with further help of gravity) separate from the slurry, where the pieces can be collected at the bottom of the separation chamber.

Due to the use of the floating material, the space needed for the separation process is relatively small compared to the machinery used today. No long conveying belts and trays rinsed with cleaning water are needed. No gas is needed to keep the conveying belts running.

The system provides for a simple construction of the separation tank, whereby gravity or only gravity is used for separation of heavy pieces having the second density, such as gold, silver, cobalt and the like, from granular material, such as sand, stones or plastic. The system does not require expensive diesel motors to run the system or to achieve a counter flow of liquids through the system. Further, no excess amounts of water are needed. This reduces cost for mining and recycling and reduces the environmental burden compared to mining and recycling techniques used today.

In one aspect, only gravity is used to cause a flow in the separation tank. In another aspect, a use of counter flow of liquids in the system is disclaimed. In one aspect, the flow of liquid through the system is continuously. A pump may be used to fill the separation tank or to re-use water and floating material.

In one aspect, the distance between the pipe outlet and the tank outlet in a vertical direction is 3 to 50 times larger than the distance between the bottom of the separation tank and the pipe outlet in a vertical direction, and preferably the distance between the pipe outlet and the tank outlet is at least three times, or at least four times the distance between the bottom of the separation tank and the pipe outlet in a vertical direction. The larger the ratio of distance d versus distance h, the more turbulence will be caused, which in turn improves separation of the particles having a second density.

In another aspect, the pipe outlet is positioned in a lower fourth of the separation tank. In another aspect, the pipe outlet is positioned in a lower fifth of the separation tank. The closer the pipe outlet is to the bottom of the separation tank; the more turbulence is caused at the bottom of the separation tank and accordingly the separation of the heavy pieces from the slurry is improved. However, the pipe outlet should be located at least at a minimum distance above the bottom of the separation tank to allow the slurry with the pieces to enter the separation tank. The minimum distance depends on the size of the pieces to be separated. The minimum distance may be at least three times the average diameter of the granular material so that a continues flow through the separation tank occurs.

In one aspect, the pipe outlet is positioned in the proximity of the bottom of the separation tank. With the term "in the proximity of the bottom of the separation tank" is meant that the distance between the bottom and the pipe outlet (distance d) is at least 50 times less than the distance between the pipe outlet and the separation tank outlet (distance h). Thus, the pipe ends just above the bottom of the separation tank and causes a turbulence in the flow in the separation tank near the pipe outlet.

In one aspect, the separation chamber has a larger volume than the volume of the channel defined by the pipe. This will cause a decrease in flow rate of the slurry upon entering the separation chamber. The slurry rises in the separation chamber at a flow rate that is lower compared to the flow rate in the pipe. The ratio of flow rate in the pipe versus the flow rate in the separation tank is for example 100:0.1, or 100:1, or 50:1. The collision, the turbulence caused by the collision, the decrease in flow rate and gravity cause the pieces having a second density to separate from the slurry. Said pieces sink to the bottom of the separation tank, where they can be collected in the trap.

In one aspect, the separation chamber is tapered towards the tank outlet. An advantage of this is that there will be a more controlled movement of the slurry towards the tank outlet and less amount of residual elements, such as sand and stones, stay in the separation chamber. Further, more movement and turbulence are created.

The separation tank has a vertical central axis, and the tank outlet is arranged on a first side wall located on one side of the vertical central axis, and the pipe outlet is located on an opposite side of the vertical central axis. In one aspect, the tank outlet and the pipe outlet are disposed in opposite ends of the separation tank with respect to the vertical central axis.

In one aspect, the pipe is arranged substantially vertical. In one aspect, the channel is tapering towards the pipe outlet. Due to the fact that the channel is tapering towards the pipe outlet, the pressure of the slurry increases towards the pipe outlet. Thus, the flow rate will be increased at the bottom of the separation tank. It also makes addition of the material in the tank more convenient.

In one aspect, the separation tank comprises at least one partition wall disposed between the channel and the separation chamber, and there is an opening between a lower end of the at least one partition wall and the bottom to allow the slurry to enter the separation chamber from the pipe outlet.

In one aspect, the at least one partition wall comprises a first partition wall and the separation chamber is arranged between the first partition wall, the first side wall, and the bottom of the separation tank. The separation chamber is formed between the first partition wall, the first side wall, and the bottom of the separation tank. The first partition wall is inclined with respect to the first side wall so that the separation chamber is tapering towards the tank outlet. The first partition wall and the first side wall are non-parallel, and a distance between the first partition wall and the first side wall decreases towards the tank outlet. Thus, the separation chamber is tapered towards the tank outlet, whereby a more controlled movement of the slurry towards the tank outlet is achieved.

The first partition wall is inclined upwards towards the tank outlet. For example, the angle between the first partition wall and the first side wall in the separation chamber is between 30° and 60°, and preferably between 35° and 50°.

In one aspect, the separation tank comprises a second side wall opposite the first side wall, said at least one partition wall comprises a second partition wall arranged between the first partition wall and the second side wall to form said pipe, and said channel is arranged between the second side wall and the second partition wall.

In one aspect, the second side wall and the second partition wall are non-parallel, and the distance between the second partition wall and the second side wall decreases towards the pipe outlet. Thus, the channel is tapering towards the pipe outlet. The second partition wall is inclined with respect to the second side wall so that the channel is tapering towards the pipe outlet. The angle of inclination may be 10 to 60°.

In one aspect, the first and second side walls are substantially vertical.

In one aspect, the second side wall is arranged opposite to the first side wall, and the pipe is located at a second side wall. Thus, the pipe outlet and the tank outlet are positioned at opposite ends of the separation chamber. The second wall may be part of the pipe.

The shape of the separation tank may vary. For example, the separation tank can be cylindrical. In one aspect, the separation tank is rectangular. A rectangular separation tank makes it easier to mount the inclined partition wall(s).

In one aspect, the system comprises an upper tank for housing the slurry, the separation tank being arranged at least partly below the upper tank in a vertical direction so that the bottom of the separation tank is located below a bottom of the upper tank, said pipe is arranged between the upper tank and the separation tank to allow the slurry to flow from the upper tank to the separation tank.

The granular material comprising the pieces having a second density are mixed with the floating material and water in the upper tank. The floating material allows the granular material with the pieces having a second density to float in the upper tank. Due to gravity and the differences in density of the granular material and pieces in the slurry, the material and pieces of the slurry may be separated during transport from a top of the upper tank to a bottom of the upper tank. By the time the slurry flows from the upper tank, through the pipe into the separation tank, more of the material with the highest density (e.g. heavy metal pieces) may be positioned at the bottom of the upper tank and thus sink or flow to the bottom of the separation tank, where the pieces can be collected, while any material of less density (e.g. sand, stones, the floating material) will stay afloat and pass through the separation tank. The turbulence in the separation tank causes the pieces having a second density to settle at the bottom of the separation tank. The flow of liquids through the system is continuous and caused mainly or only by gravity. This reduces costs for operating the system. Also, no environmentally unfriendly chemicals are needed for extraction or recovery of the pieces having a second density. The system does neither require an excess of water to run the system. This allows for an economically and environmentally favorable system for separating pieces having a second density from granular material.

The upper tank is positioned above the separation tank in a vertical direction along a longitudinal axis, such that gravity can be used to flow the slurry through the system. The opening of the pipe on the bottom of the upper tank is preferably smaller in diameter compared to the opening on the top of the upper tank. The diameter of the upper tank may decrease towards the opening in the bottom of the upper tank. The angle β between the side wall of the upper tank and the longitudinal axis extending through the upper tank, for at least part of the side wall, may be between 1 and 90°. This causes a pressure on the slurry, which increases the flow rate of the slurry entering the pipe. The smaller angle β, the more increased the flow rate will be at the bottom of the upper tank. A pump may be used to increase the flow of slurry towards the separation tank. This increase in flow rate improves turbulence in the separation tank and thus separation of the pieces having a second density.

In one aspect, the system comprises a valve, for controlling the flow of slurry from the upper tank into the separation tank. Preferably, the valve is arranged in connection to, or on, the pipe.

In one aspect, the system comprises a collecting tank arranged in liquid communication with the separation tank, whereby the collecting tank has an outlet for transporting the liquid from the system, a storage tank for storage of a mixture of floating material and water and arranged in liquid communication with the collecting tank and the upper tank, a pump arranged for transport of liquid from the collecting tank to said storage tank, a floating material tank arranged in liquid communication with the said storage tank for storing floating material and adding floating material to said storage tank, and a water tank arranged in liquid communication with the collecting tank for storing water and adding water to the collecting tank. With the term "arranged in liquid communication with" is meant that liquid is allowed to flow between the tanks in at least one direction.

In one aspect, the trap is removable from the separation tank to facilitate removal of the separated pieces.

In an aspect, the trap is a tray for collecting pieces having a second density arranged at least partly below the outlet of the pipe. The trap or tray is positioned at the bottom of the separation tank, preferably in proximity of the pipe outlet. This may improve the efficiency of separation of the heavy pieces. The tray can be taken out from the separation tank to collect the heavy metal pieces. In another aspect, the trap can be removed during operation of the system. Advantageously, the system does not have to stop to collect the separated and settled pieces. While the continuous flow of slurry passes the separation tank, the tray can be emptied and returned. This reduces time for extraction and recycling and thus reduces costs for running the system. One or more opening member, such as a shutting door, will be open when the tray is present in the separation tank and closed when removing the tray from the separation tank, such that no opening is present through which the liquid could flow during removal and absence of the tray. Two or more opening members may be used, such that the trap or tray can be removed from one side of the separation tank while a second trap or tray is inserted from another side of the separation tank. This improves effectiveness and efficiency of the overall system and reduces costs.

In a further aspect, the separation tank outlet is connected to a second pipe of a second system for separating pieces of a third density, the third density being less than the second density and more than the first density, from the granular material. The separation tank of the first system becomes the upper tank of the second system. A series of systems allows for separation of pieces having different densities. By optimizing flow rate (among other by adjusting the dimensions of the pipe, channels and outlet) and the first density of the floating material, the series of systems can be used for the separation of different metals having different densities. For example, gold may be collected in the first separation tank, silver in the second separation tank and cobalt in the third separation tank. Another example is that a series of systems may collect heavy pieces having a second density of different size but of the same material. Or metals may be collected in the first separation tank and plastics in the second separation tank.

In an aspect, the system comprises a piping arrangement for transporting water and the floating material and returning the water and the floating material to the separation or upper tank. A filtering member may be used in the pipe arrangement for filtering water and/or the floating material. Systems used today for mining consume a lot of water. The impact on the environment for the supply of water needed for mining is a huge problem. Usually the water is taken from nearby rivers or lakes and routed to newly constructed ponds. The system of the disclosure allows for re-use of water. This reduces the impact on the environment and reduces cost for mining substantially. Also, the re-use of the floating material reduces costs. The flowing water mixed with floating material is likely to be less sensitive to freezing and this thus allows mining to be performed under conditions, where water normally freezes. The entire system may also be positioned inside a building that can be heated to above freezing temperature, thereby preventing freezing of the water. This improves effectiveness and efficiency of mining.

In one aspect, the system comprises a collecting tank arranged to receive the slurry or liquid from the separation tank, whereby the collecting tank has an outlet adapted to transport the slurry or liquid from the system.

The disclosure also relates to a method for separating pieces having a second density from granular material using one or more aspects as defined above, as defined in claim 13.

The method comprises:
grinding the granular material mixed with the pieces having a second density to provide grains of the granular material having a maximum diameter,
feeding water and a floating material to the separation tank via the pipe,
feeding the processed granular material mixed with the pieces having a second density to the pipe of the separation tank,
separating the pieces having a second density from the slurry (by means of gravity) in the separation chamber,
collecting the separated pieces having a second density in the trap, and
removing the slurry with the lower content of pieces having a second density from the separation chamber via the tank outlet.

Subsequently, the pieces having a second density can be collected from the separation tank. Water and the slurry may be filtered and re-used.

The system allows for use of more than one separation tank that operate in parallel, whereby each tank can be used for the separation of a particular piece of second or third or fourth density.

The granulate material may be any combination of materials, whereby the materials have different densities. The granular material may be naturally occurring granular material or granular material originating from a waste plant. The maximum diameter of the pieces may be between 0.1 and 100 mm, or between 1 and 50 mm, or between 1 and 25 mm, or between 1 and 10 mm. In one aspect, the maximum diameter in the floating material in a first system may be about 8 mm.

In an aspect of the method above, the density of floating material in the one or more tank is varied depending on the maximum diameter of the granular material by adjusting the amount of water or floating material per liter of floating material. By varying the amount of floating material, the density of the slurry will change. A thicker slurry can be used for more dense pieces and thinner slurry can be used for pieces of less density. Thus, in parallel connected tanks, each particular (upper and) separation tank can be used for separation of a particular heavy piece by varying the thickness of the slurry between tanks. For example, gold may be separated in a first tank and silver may be separated in the second tank, or metals may be separated in a first tank, hard plastics in a second tank and soft plastics in a third tank.

In another aspect, a ratio of first density versus second density 1:1.1 to 0.5:1000. The higher the ratio between the densities, the easier the pieces can be separated.

In yet another aspect, a piece having the second density (also called heavy pieces) is any material. The floating material having a first density is material having a density that is lower than the density of the pieces having a second density. For example, the first density may be a density below 1 $g/cm^3$ and the second density may be a density of at least 1 $g/cm^3$. Examples of pieces having the second density may be a metal, or the pieces having a second density may be gold, silver, aluminum, plastic, rubber, gemstones, diamond, quarts, cobalt.

In a further aspect, the floating material is bentonite, hydrocolloids or cellulose derivatives. In another aspect, the floating material is bentonite or cellulose or cellulose derivatives. In yet a further aspect, the floating material is sodium bentonite. The density of any floating material can be varied by varying the amount of floating material per volume of water. The first density can thus be adapted to the second density such that the first density is always below the second density of the material that is to be separated. The density of floating material in one or more tanks may be varied by adjusting the amount of water or floating material per liter or by varying the type of floating material. In one aspect, the floating material is water.

BRIEF DESCRIPTION OF THE DRAWINGS

The invention will now be explained more closely by the description of different aspects of the invention and with reference to the appended figures.

DETAILED DESCRIPTION

Figure 1:
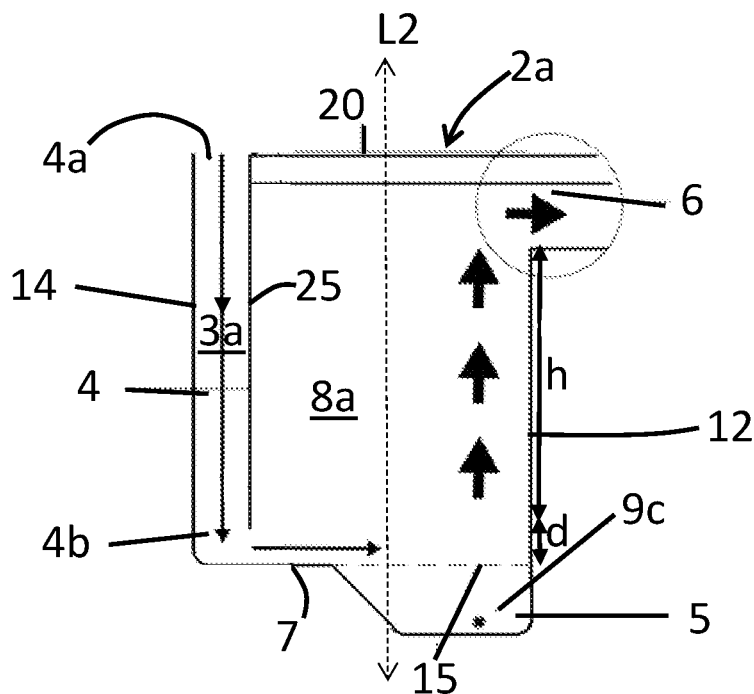
FIG. 1 shows a first example of a separation tank.

Aspects of the present disclosure will be described more fully hereinafter with reference to the accompanying drawings. The system and method disclosed herein can, however, be realized in many different forms and should not be construed as being limited to the aspects set forth herein. Like numbers in the drawings refer to like elements throughout.

The terminology used herein is for describing particular aspects of the disclosure only and is not intended to limit the invention. As used herein, the singular forms "a", "an" and "the" are intended to include the plural forms as well, unless the context clearly indicates otherwise. It is to be understood that the upper tank is optionally present in the system.

Unless otherwise defined, "substantially vertical" means vertical with a maximum deviation from a vertical axis of 10°. Unless otherwise defined, "substantially horizontal" means horizontal with a maximum deviation from a horizontal axis of 10°, whereby the horizontal axis extend perpendicular to the vertical axis L.

A slurry is a liquid mixture of a solid with a fluid (usually water). Slurries behave in some ways like thick fluids, flowing under gravity and are also capable of being pumped if not too thick. Unless otherwise defined, "slurry" is a liquid mixture of water and granular material and floating material and heavy pieces having a second, third, fourth, etc. density.

Unless otherwise defined, "liquid" is any fluid mixture, and may be slurry. "Liquid" may be slurry with a lower content of pieces having a second density, e.g. the liquid that exits in the separation tank.

Unless otherwise defined, "first, second or third density" is a density in $g/cm^3$ of the indicated material, whereby the first density is the lowest density, the second density the highest density and any subsequent density is a density between the first and second density. Thus, the first density may be 3.5 $g/cm^3$, the second density may be 18 $g/cm^3$ and a third density may be 7 $g/cm^3$, a fourth density may be 10 $g/cm^3$.

Unless otherwise defined "turbulence" or "turbulent flow" is any pattern of fluid motion characterized by chaotic changes in pressure and flow velocity/rate.

Unless otherwise defined "grinding" means a process for reducing size of material by cutting, crushing, atomization, grinding, pulverization, levigation and the like.

Unless otherwise defined "heavy pieces" means pieces having a second, third, fourth, etc. density.

Unless otherwise defined "bentonite" is an absorbent aluminum phyllosilicate clay consisting mostly of montmorillonite. Bentonite may be sodium bentonite.

Unless otherwise defined, all terms used herein have the same meaning as commonly understood by one of ordinary skill in the art to which this disclosure belongs.

The arrows in the figures indicate the route of the flow of liquid or slurry through the system.

FIG. 1 shows an example of a system for separating pieces having a second density from granular material. The system includes a separation tank 2a. The separation tank 2a comprises a first side wall 12 provided with a tank outlet 6. In one aspect, the tank outlet 6 is an opening in the first side wall of the separation tank. The separation tank 2a further comprises a bottom 7, and a pipe 4 defining a channel 3a for allowing a slurry of water, a floating material having a first density, which is less than the second density, granular material and the pieces having the second density, to flow into the separation tank 2a. The pipe 4 has a pipe inlet 4a in an upper end of the pipe, and a pipe outlet 4b in a lower end of the pipe.

The pipe outlet 4b is located in a lower third of the separation tank 2a. Preferably, the pipe outlet 4b is located in a lower fourth of the separation tank 2a, and most preferably in a lower fifth of the separation tank. The pipe outlet 4b is positioned in a close proximity of the bottom 7 of the separation tank 2 to promote a flow of the slurry to collide at the bottom of the separation tank and then move upwards to the separation tank outlet.

The pipe outlet 4b is facing the bottom 7 of the separation tank so that the slurry is entering the interior of the separation tank substantially perpendicular to the bottom 7 to cause a turbulent flow of the slurry in the separation tank. The pipe outlet is an opening in the lower end of the pipe 4. The opening of the pipe outlet 4b defines a plane substantially parallel with the bottom of the separation chamber. The pipe outlet 4b is an opening between the channel 3a and the interior of the separation tank 2a. The pipe outlet 4b is spaced apart from the tank outlet 6 in a horizontal and vertical direction. The tank outlet 6 is arranged above the pipe outlet 4b in a vertical direction.

The pipe outlet 4b is located a distance d from the bottom 7 of the separation tank in a vertical direction. The distance d depends on the total size of the separation tank and the size of the pieces to be separated. Distance d may be at least twice or three times the average diameter of the granular material.

The tank outlet 6 is located a distance h from the pipe outlet 4b in a vertical direction. The distance h is larger than the distance d. The distance h may be 3 to 50 times larger than the distance d. Preferably, the distance h is at least twice the distance d. In one aspect, the distance h is at least 3 times the distance d, and preferably the distance h is at least 4 times the distance d. The ratio between distance d and h is such that the flow rate decreases upon entering of the slurry in the separation tank, such that a proper separation of the pieces having a second density can occur.

Figure 2:
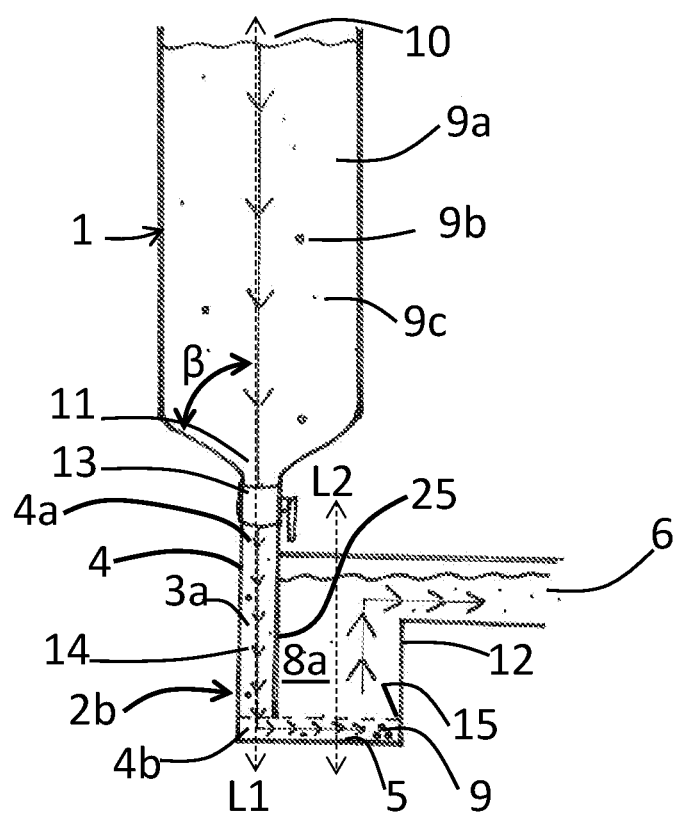
FIG. 2 shows an example of a system of the disclosure including a separation tank and an optional upper tank.

In the example of FIGS. 1 and 2, the pipe 4 is vertical. In this example, the separation tank comprises a partition wall 25 separating channel 3a and separation chamber 8a. The pipe comprises side wall 14 and partition wall 25 of the separation tank. Alternatively, the pipe 4 is a traditional pipe with its own wall(s). In this example, the pipe inlet 4a is positioned in an upper part of the separation tank in or in the proximity of a ceiling of the separation tank. Alternatively, the upper end of the pipe extends above the side walls of the separation tank. The first and second side walls 12, 14 are arranged in opposite ends of the separation tank 2c. In one aspect, the first and second side walls 12, 14 are substantially parallel.

The separation tank 2a comprises a trap 5 for collecting pieces, such as metal pieces, having the second density 9c, arranged at the bottom 7 of the separation tank 2b.

The separation tank 2a comprises a separation chamber 8a arranged in liquid communication with the pipe outlet 4b to allow the slurry to enter the separation chamber 8a from the pipe outlet 4b. The tank outlet 6 is disposed in the separation chamber 8a.

In this example, the diameter of the pipe outlet and the pipe outlet are substantially the same.

The diameters may be different to influence the flow rate of the liquid through the system. For example, the diameter of the tank outlet may be 10% larger than the diameter of the pipe outlet.

The separation tank 2a may have an inspection opening 20, which may be a closable door or window. A central axis L2 of the separation tank 2a extends along a vertical line.

Figure 5:
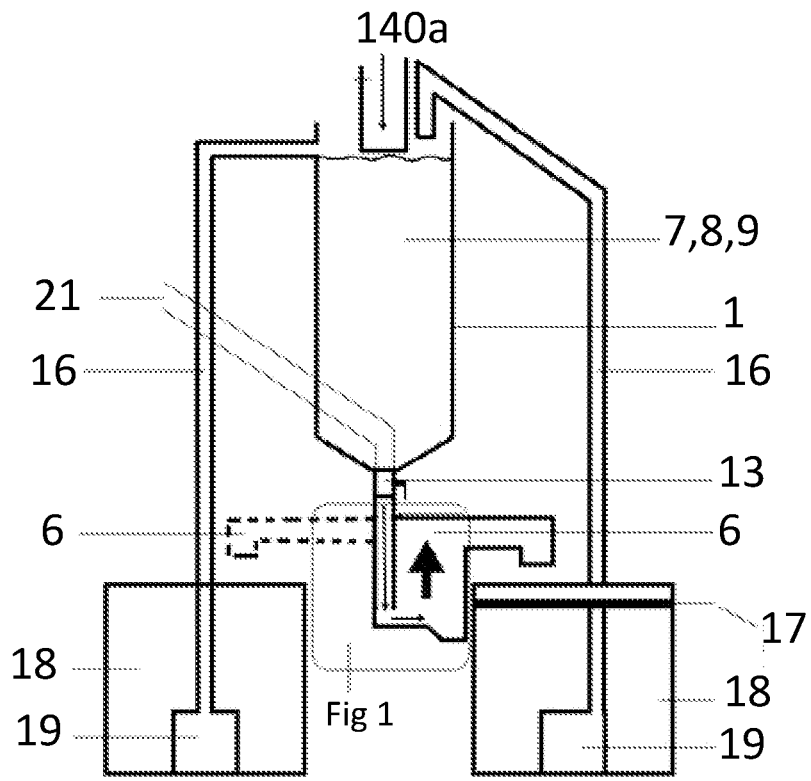
FIG. 5 shows an example of the system with piping for reuse of water and floating material.

The slurry may enter the pipe 4 of separation tank from an upper tank 1, as shown in FIG. 2 or through a slurry pipe 21 as shown in FIG. 5.

As shown in FIG. 2, the system may have an upper tank 1 arranged to receive granular material. The granular material may be naturally occurring granular material, such as material from soil or a mountain. The granular material may be any other material. The granular material may originate from waste products from electronic goods, such as batteries, computers, credit cards, printed circuit board, radios, wires and the like. The granular material may originate from waste products from construction, such as windows with frames and the like. The granular material comprises the heavy pieces having a second density and is poured or shuffled into a collecting tank or the upper tank 1, where it is mixed with water and floating material inside the tank. This mixture of materials inside the upper tank forms a slurry. The upper tank may comprise water, a floating material 9a, sand or rocks 9b and pieces of heavy metal 9c, etc. The upper tank may thus have a mixing function as well as a separation function.

Mixing may occur in the upper half or one third of the upper tank, while separation occurs in the lower half or lower two thirds of the upper tank.

Alternatively, if no upper tank is present, a slurry may be added to the separation tank for separation and settling of the pieces having a second density. If an upper tank 1 is present, the slurry is mixed in the upper tank.

The first density of the floating material is less than the second density of the heavy pieces. For example, the first density of the floating material, under moisture conditions may be below 2 g/cm$^3$, or between about 0.1 and 2 g/cm$^3$ or between about 0.5 and 1.85 g/cm$^3$ or between about 0.1 and 1.8 g/cm$^3$ or between about 0.2 and 1.5 g/cm$^3$, about between 0.4 and 1 g/cm$^3$ about between 0.4 and 0.7 g/cm$^3$ or about 0.6 g/cm$^3$. The floating material may be bentonite, such as sodium bentonite, calcium bentonite or potassium bentonite or mixtures thereof. The floating material may be sodium bentonite, which has a density of 0.593 g/cm$^3$. The floating material may be cellulose or a cellulose derivative, such as hydroxypropyl cellulose (HPC), hydroxypropyl methylcellulose (HPMC), ethyl cellulose (EC), hydroxyethyl cellulose (HEC), methylcellulose (MC) or mixtures thereof. The floating material may be hydrocolloids, such as Carbopol™, gum arabic, polycatbonate, polyacrylate, polystyrene, gelatin, alginate, polymethacrylate, gelucir, polyvinyl acetate, polyvinyl lactam, gum guar, carrageenanm sodium alginate, agar, or mixtures thereof.

The density of the pieces having the second density may be about at least 1, 2, or 3.5 or 5 g/cm$^3$ or 10, 20, 50, 100 g/cm$^3$. Examples of pieces having the second density may be metal, gemstones, any kind of plastics or wood. For example, the pieces having the second density may be gold, silver, aluminum, plastic, rubber, gemstones, diamond, quarts, cobalt, and so on.

A ratio between the first density and second density may be 0.1:1000, or 0.5:100, or 1:100, or 0.5:50, or 1 to 50, or 0.5:25.

The upper tank has a central axis L1 extending between a top end 10 and a bottom end 11 of the upper tank 1. Preferably, the central axis L1 is vertical. The opening at the top end 10 is, according to some aspects, larger in diameter than the opening at the bottom end 11. The diameter of the upper tank 1 is preferably reduced towards the opening 11 at the bottom. The reduction in diameters or an increase in ratio in diameters between the upper end and bottom end is advantageous to increase the pressure on the slurry at the bottom end. The pressure pushes, and gravity pulls the slurry through the opening of the upper tank 1 into the pipe 4. The exact diameter of the upper tank depends on the scale of the system and the density and size of the materials used inside the tanks. As long as the opening at the top end is at least twice, or between three and ten times larger than the opening at the bottom end 11 of the upper tank, a pressure will be built at the bottom end 11 that will push a flow of slurry into the separation tank 2. The walls of the upper tank may extend along the central axis L1 and the bottom of the upper tank 1 may be rounded or flat extending perpendicular to the central axis L1. The entire or a lower portion of the walls of the upper tank may extend at an angle β in relation to the central axis, such that the diameter of the upper tank decreases towards the bottom of the upper tank. One or more side walls of the upper tank may be inclined at an angle between 1 and 90°, or between 15 and 75°, or between 30 and 60°, or around or up to 45° in relation to the central axis L1. A smaller angle will increase the pressure and flow rate.

The pipe 4 is connected to the opening at the bottom end 11 of the upper tank 1 allowing the slurry to flow from the upper tank 1 into the separation tank 2. The pipe 4 has a pipe inlet 4a and a pipe outlet 4b located on a lower third of the separation tank 2. The pipe 4 is preferably arranged substantially vertical. The pipe 4 may be angled between 0 and 60° from a vertical axis. The pipe 4 is preferably not angled more than 45° from the vertical axis. The inclination of the pipe 4 will affect the pressure and flow rate of the slurry through the system. The liquid or slurry that enters the separation tank 2 at the pipe outlet 4b collides with the bottom 7 of the separation tank 2, where the flow preferably changes direction from substantially vertical downwards to substantially horizontal and enters the separation chamber 8a. In the separation chamber 8a, the flow subsequently changes to substantially vertical upwards towards the tank outlet 6 of the separation chamber 8a. The separation chamber 8a has a larger volume compared to the channel 3a defined by the pipe 4, which causes a decrease in flow rate of the slurry upon entering the separation chamber 8a. The slurry rises in the separation tank at a flow rate that is lower compared to the flow rate in the pipe. The ratio of flow rate of in the pipe versus the flow rate in the separation tank may be 100:0.1, or 100:1, or 50:1. The collision, the turbulence caused by the collision, the decrease in flow rate and gravity cause the pieces having a second density or heavy pieces to separate from the slurry.

Said pieces sink to the bottom of the separation tank, where they can be collected in the trap 5.

The area or diameter of the pipe outlet 4b of the pipe 4 may be substantially the same or the same as the area or diameter of a pipe inlet 4a in the bottom of the upper tank if present. According to some aspects, the area or diameter of the pipe outlet 4b is less than the area or diameter of the pipe inlet 4a to increase the pressure of the slurry inside the pipe 4 prior to entering the separation tank.

According to some aspects, the pipe 4 is arranged adjacent a second side wall 14 of the separation tank. The second side wall 14 may be shaped such that the pipe outlet 4b is a vertical outlet so that the slurry enters the separation tank in a substantial vertical direction or from above. The pipe 4 may enter in a roof of the separation tank and end just above the bottom 7 of the separation tank as shown in FIGS. 1 and 2. The first and second side walls 12, 14 are arranged in opposite ends of the separation tank 2c. In one aspect, the first and second side walls 12, 14 are substantially parallel.

The system may comprise one or more valves 13 for controlling the flow of slurry. For example, as shown in FIGS. 2 and 5, a valve 13 may be present on the pipe 4 to control the flow of slurry from the upper tank 1 to the separation tank 2.

The separation tank 2 is arranged to receive the slurry from the upper tank. The separation tank is arranged at least partly below the upper tank 1 so that the bottom of the separation tank is located below a bottom of the upper tank in a vertical direction along the central axis L2, in order to use gravity for the flow of slurry from the upper tank to the separation tank. The difference in distance between the bottom of the upper tank and the bottom of the separation tank affects the pressure and flow rate of the slurry through the system.

The separation tank outlet 6 is arranged in the side wall 12 for allowing the liquid or slurry with a reduced content of heavy pieces having a second density to flow out of the separation tank 2. The tank outlet 6 is arranged above the pipe outlet 4b in a vertical direction. The tank outlet 6 is spaced apart from the pipe outlet 4b in a horizontal direction substantially perpendicularly to the central axis L2. The tank outlet 6 may be positioned on the opposite side of the central axis L2 as the pipe outlet 4b, as shown in FIGS. 1 to 5. The tank outlet 6 may be arranged in a higher one third of the separation tank side wall 12 or adjacent to or in close proximity of the separation tank ceiling.

The separation tank 2 comprises a trap 5 for collecting the heavy pieces. The trap may be any type of trap adapted to collect the pieces having a second, third, fourth, etc. density during use of the system. The trap may be a tray that can be removed from the separation tank and replaced after collecting the heavy pieces. One or more opening member 15, such as a shutting door, may be present that close upon removal of the trap or tray 5 and open when the trap or tray is fed in the separation tank 2. The trap is preferably positioned in the proximity of the outlet 4b of the pipe 4. The trap 5 may be arranged at least partly or completely below the outlet 4b of the pipe to improve efficiency of separation.

Figure 3A:
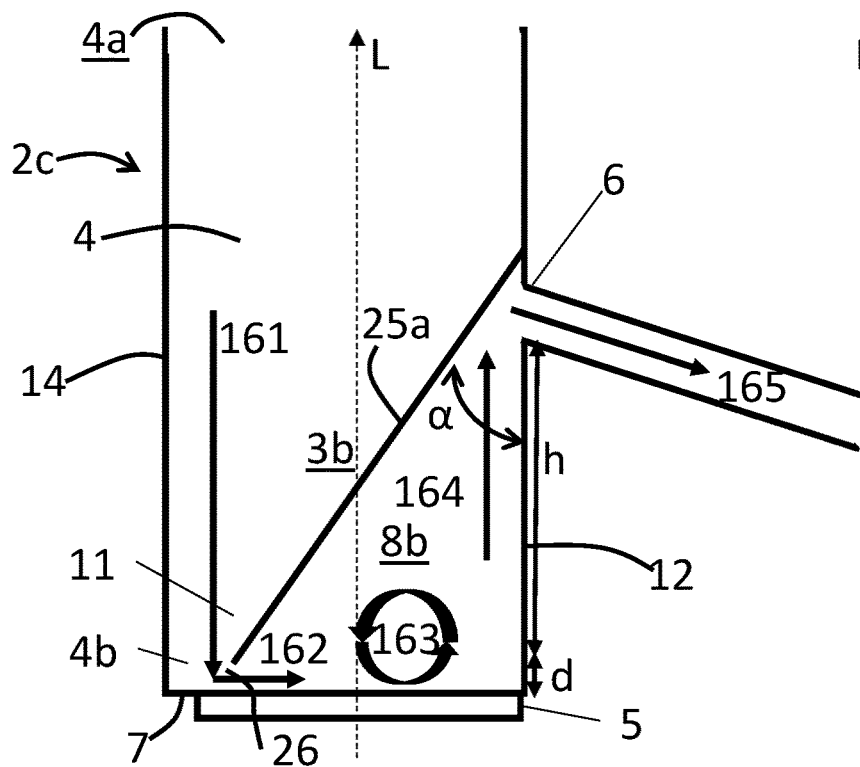
FIG. 3a shows a second example of a separation tank.

FIG. 3a show a second example of the system comprising a separation tank 2c. The separation tank 2c comprises a first side wall 12, a second side wall 14 opposite the first side wall 12, a pipe 4 having a pipe inlet 4a and a pipe outlet 4b, and a separation chamber 8b. The pipe 4 defines a channel 3b. The separation tank 2c further comprises a partition wall 25a dividing the separation tank 2c into the channel 3b and the separation chamber 8b. In this example, the partition wall 25a represent a wall of the pipe 4 as well as a wall of the separation chamber 8b. The pipe outlet 4b is an opening between the second side wall 14 and the first partition wall 25a.

There is an opening 26 between a lower end of the partition wall 25a and the bottom 7 of the separation tank to allow the slurry to enter the separation chamber 8b from the pipe outlet 4b. Distance d may be defined as the distance between an end of the pipe at the pipe outlet and the bottom of the separation tank 2. In this example, the separation chamber 8b is tapered towards the tank outlet 6 to enhance the flow towards the tank outlet, and the channel 3b is tapered towards the pipe outlet 4b to increase the pressure of the slurry that enters the separation tank.

The first and second side walls 12, 14 are arranged in opposite ends of the separation tank 2c. In one aspect, the first and second side walls 12, 14 are substantially parallel. The separation chamber 8b is arranged between the partition wall 25a, the first side wall 12, the third and fourth walls 12b, 12c and the bottom 7 of the separation tank 2c. The partition wall 25a is inclined with respect to the first side wall 12 so that the distance between the partition wall 25a and the first side wall 12 is decreasing towards the tank outlet 6. Further, the partition wall 25a is inclined with respect to the second side wall 14 so that the distance between the partition wall 25a and the second side wall 14 decreases towards the pipe outlet 4b. The first partition wall 25a is inclined upwards towards the tank outlet 6. For example, the angle α between the first partition wall 25a and the first side wall 12 in the separation chamber is between 30° and 60°, and preferably between 35° and 55°. The area or diameter of the pipe inlet 4a may be larger than the area of the pipe outlet 4b. Preferably, there is a sealing between the first partition wall 25a and the side walls 12b, 12c of the separation tank to prevent leakage of slurry from the channel 3c to the separation chamber.

As shown in FIG. 3a, the slurry flows (161) from the pipe inlet 4a via the channel 3b towards the pipe outlet 4b. The slurry leaves the pipe outlet 4b in a substantially vertical direction, and the flow changes to a horizontal direction (162) when it hits the bottom 7 of the separation chamber. The flow enters the separation chamber 8b through opening 26, where a turbulence (163) is caused. The pieces having a second density are separated from the slurry, which pieces settle at the bottom of the separation tank in the trap 5. The liquid than flows upwards (164) toward the tank outlet 6 and out of the separation tank (165).

Figure 3B:
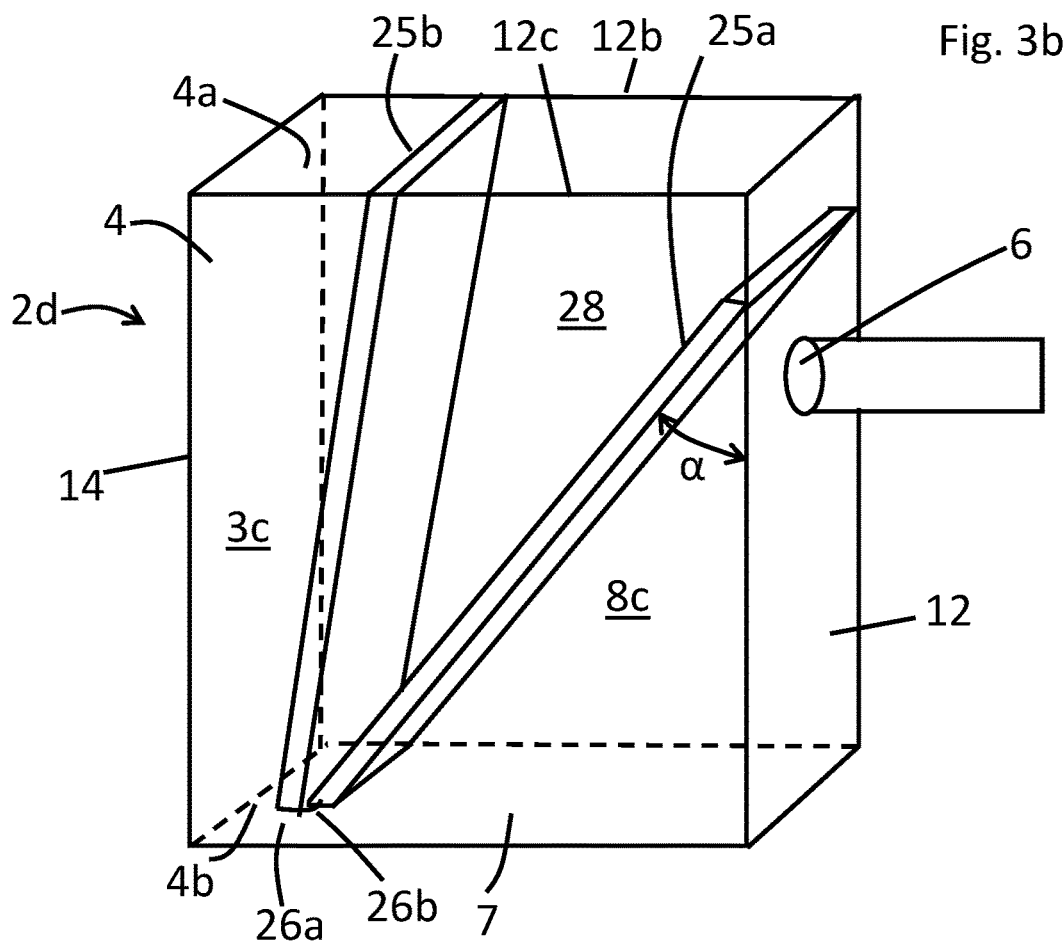
FIG. 3b shows a third example of a separation tank.

FIG. 3b show a third example of the system comprising a separation tank 2d. In this example, the separation tank 2d is rectangular and has four side walls. However, the shape of the separation chamber may vary, for example, the separation tank can be cylindrical. The separation tank 2d comprises a first side wall 12, a second side wall 14 opposite the first side wall 12, a pipe 4 having a pipe inlet 4a and a pipe outlet 4b. The pipe 4 defines a channel 3c. In this example, the separation tank 2d further comprises a third and a fourth side wall 12b, 12c opposite each other. The separation tank 2d further comprises a first partition wall 25a and a second partition wall 25b dividing the separation tank 2d into the channel 3c and a separation chamber 8c. The first and second partition walls 25a-b are attached to side walls of the separation tank. There may be a sealing between the partition walls 25a-b and the side walls of the separation tank to prevent leakage of slurry between the partition walls 25a-b and the side walls of the separation tank.

In one aspect, the lower ends of the first and second partition walls 25a-b are attached to each other. In this example, the upper end of the first partition wall 25a is attached to the first side wall 12 above the tank outlet 6. In this example, the first and second partition walls extend between the third and fourth side walls 12c-b of the separation tank, and are attached to the third and fourth side walls 12c-b.

There is an opening 26 between the lower ends of the first and second partition walls 25a-b and the bottom 7 of the separation tank to allow the slurry to enter the separation chamber 8c from the pipe outlet 4b. There is an opening 26a-b between a bottom end of the partition walls 25a-b and the bottom 7 of the separation tank. A chamber 28 is formed between the partition walls 25a-b as shown in FIG. 3b, the slurry is allowed to enter the chamber 28 before flowing through the separation chamber 8c. Such chamber 28 improves the separation of pieces having a second density.

In one aspect, the first and second side walls 12, 14 are substantially parallel. In another aspect, the third and fourth side walls 12b-c are substantially parallel. The first and second side walls 12, 14 are arranged opposite each other. The second partition wall 25b is arranged between the first partition wall 25a and the second side wall 14 to form the pipe 4. The channel 3c is arranged between the second side wall 14, the third and fourth side walls 12b-c, and the second partition wall 25b. The second partition wall 25b is inclined with respect to the second side wall 14 so that the distance between the second partition wall 25b and the second side wall 14 decreases towards the pipe outlet 4b. Thus, the channel 3c is tapering towards the pipe outlet 4b. In this example, the area of the pipe inlet 4a is larger than the area of the pipe outlet 4b. The separation chamber 8c is arranged between the first partition wall 25a, the first side wall 12, the third and fourth side walls 12b-c, and the bottom 7 of the separation tank 2c as is shown in FIG. 3b. The first partition wall 25a is inclined with respect to the first side wall 12 so that the distance between the partition wall 25a and the first side wall 12 decreases towards the tank outlet 6. Thus, the separation chamber 8c is tapered towards the tank outlet 6 at an angle α.

Figure 4:
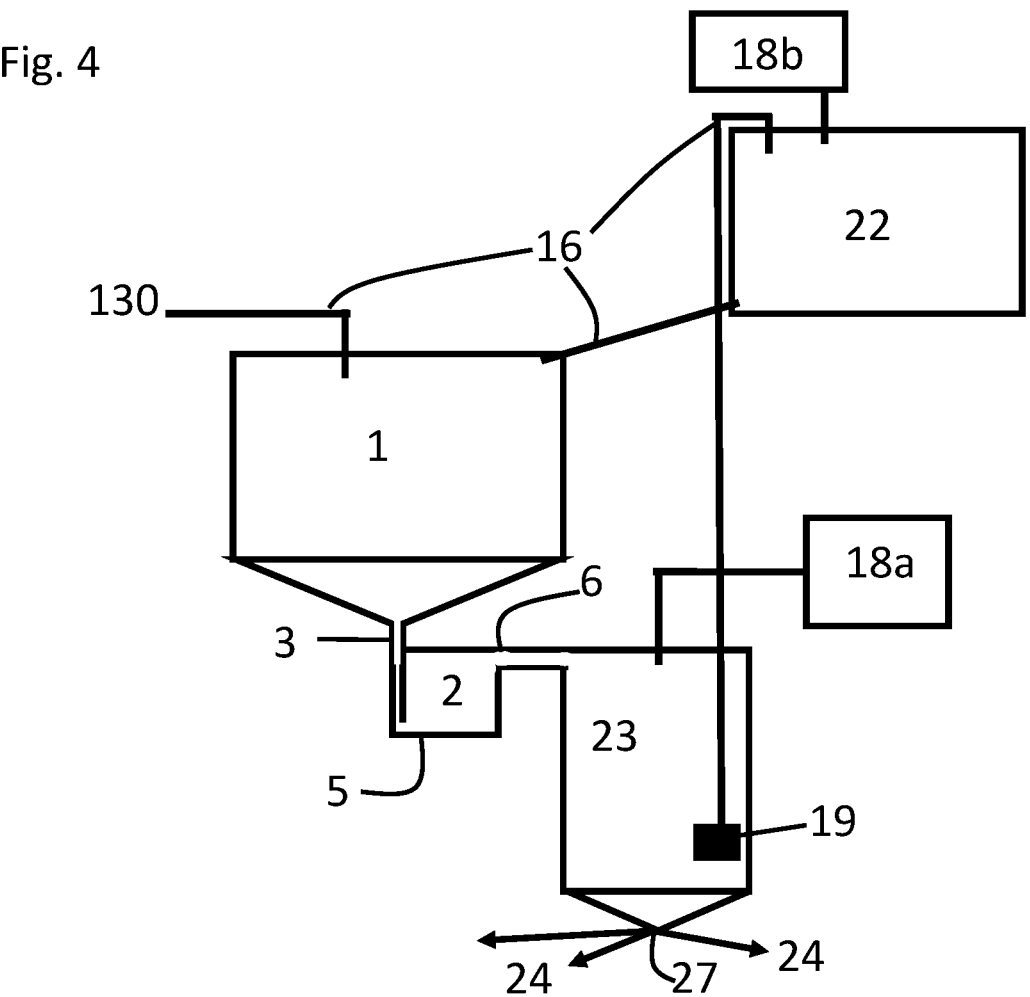
FIG. 4 shows an example of the system with piping and storage and collecting tanks.

FIG. 4 shows a system comprising an upper tank 1 adapted to receive collected granular material 130 or concentrated granular material 140 from e.g. a mine, and a mixture of floating material and water from a storage tank for mixture of floating material and water 22. The slurry is mixed and separated in the upper tank and passes through the pipe 4 to arrive into the separation tank 2. The pieces having a second density will be separated and settled in the trap 5, while the remaining liquid leaves the separation tank through the separation tank outlet 6. A collecting tank 23 received the liquid from the separation tank. At an outlet of the collecting tank 23, part of the liquid with a rest of waste material will leave the collecting tank to be transported 24 from the system. Separation may occur in the collecting tank, such that pieces having a third and fourth density can be collected at the outlet 27 of the collecting tank 23. Such pieces may be plastics, wood or metals having a lower density than the pieces having a second density. One or more pumps 19 pump the liquid from the collecting tank 23 to the storage tank 22. Preferably, this liquid is mainly or substantially a mixture of floating material and water. A filtering member may be used to filter the mixture of water and floating material prior to entering in the storage tank 22, Additional water may be added to the collecting tank from a water tank 18a. Additional floating material may be added to the storage tank 22 from a floating material tank 18b. This system shown in FIG. 4 may comprise a tank having a division wall 25 as shown in FIGS. 3a and 3b. The system may also comprise several tanks in series or in parallel as shown in FIGS. 6 and 7 and described below.

The system may be automated using sensors and computer programs to control the flow of slurry, water and other liquids during the mining process in the system.

The system may comprise a piping arrangement 16 for reuse of floating material and water as shown in FIGS. 4 and 5. The piping arrangement 16 may comprise a filtering member 17. The filtering member filters the naturally occurring granular material from the water and the floating material. As shown in FIG. 5, the liquid from the separation tank outlet 6 may be filtered by a filtering member 17, such as a sieve, such that water and floating material pass the filtering means and can be collected in one or more collection tank 18 and returned to the tank 1, 2. One collecting tank 18 may be used for water, another collecting tank may be used for water mixed with the floating material. Valves 13 in the piping arrangement 16 may be present to control the flow through the piping arrangement. A pump 19 may be used to pump water and the floating material back into the upper tank 1. The system may be automated using sensors and computer programs to control the flow of slurry, water and other liquids during the mining process in the system.

Figure 6:
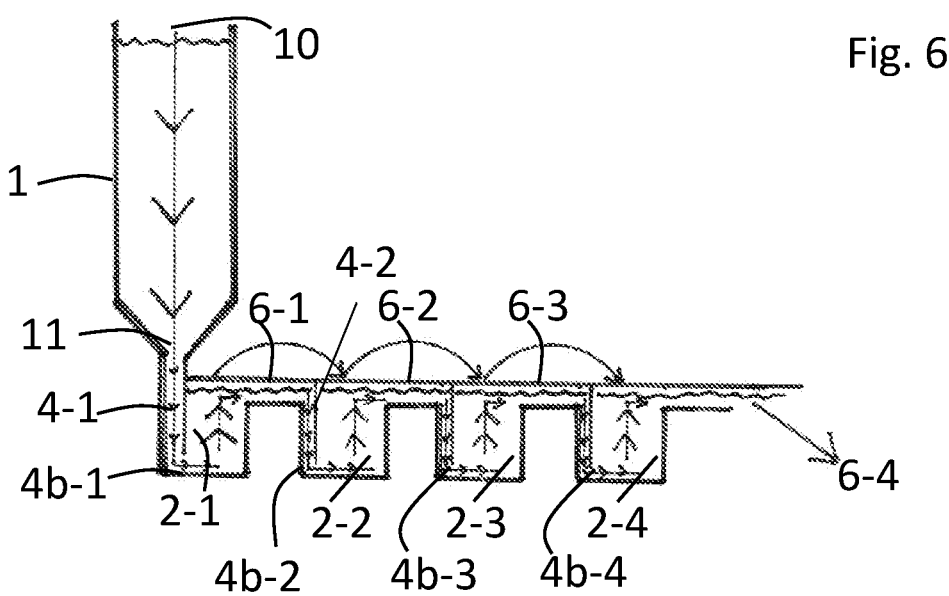
FIG. 6 shows a system with multiple separation tanks connected in series.
Figure 7:
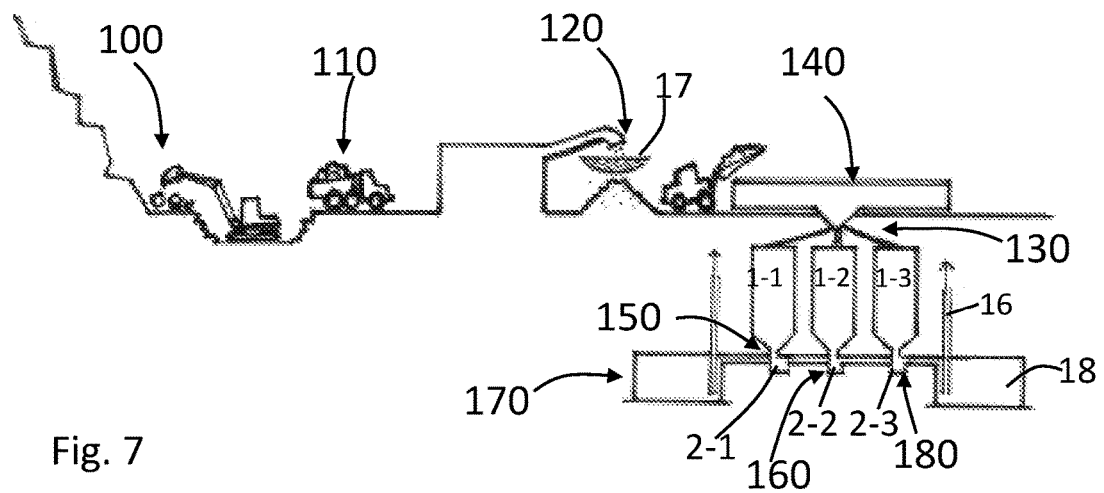
FIG. 7 shows a system with multiple separation tanks connected in parallel in use in a mining plant.

As shown in FIG. 6, several tanks may be connected in series. The tank outlet 6 of a first separation tank 2 may be connected to a pipe of a second system for separating pieces having a third density from granular material. The first systems separation tank 2 thus becomes the upper tank of the second system. FIG. 6 shows a series of four separation tanks 2-1, 2-2, 2-3 and 2-4, whereby the slurry flows from the one separation tank to the next in series. Preferably, to increase the flow of the slurry, the series of separation tanks are positioned such that the bottom of the first separation tank 2-1 is positioned above the bottom of the second separation tank 2-2 in a vertical direction along the central axis L2, which in turn is position above the bottom of the third lower tank 2-3, and so on. The tank outlet 6-1 of the first separation tank 2-1 enters a pipe 4-2 having a pipe outlet 4b-2 in the second separation tank 2-2. The outlets of the pipes 4b-1, 4b-2, 4b-3, 4b-4 and the separation tank outlets 6-2, 6-3, 6-4 may be positioned in relation to each other as described above. Thus, the separation tank outlet 6-2 of the second separation tank 2-2 is positioned above the pipe outlet 4b-2 of the second separation tank 2-2, and so on. Alternatively, to increase the flow rate through the systems, the pipes of the separation tanks can be made with a decreasing diameter such that the first separation tank 2-1 has a pipe 4-1 having a larger diameter than the diameter of pipe 4-2 of the second separation tank 2-2 and so on.

Every separation tank 2-1, 2-2, 2-3 and 2-4 comprises a trap or tray 5 for collection the separated pieces. Different pieces having a second, third, fourth, etc., density may be collected in the different separation tanks. For example, pieces having the largest density, e.g. gold having a second density of 19.32 g/cm³, may be collected in the first separation tank 2-1, and pieces having a third density, e.g. silver having a density of 10.49 g/cm³, may be collected in the second separation tank 2-2 and pieces having a fourth lower density, e.g. cobalt having a density of 8.86 g/cm³, may be collected in the third separation tank, and so on. The series connection may also be used to sort out pieces having a second density with different sizes in different tanks. In this example bentonite, which has a density of 0.593 g/cm³ could be used as floating material.

The system may also comprise several tanks connected in parallel as shown in FIG. 7. Three upper tanks 1-1, 1-2, 1-3 are positioned next to each other. Each upper tank receives material from the mining plant. By varying the density of the floating material in the systems and adapting the flow rate of the slurry through the systems, different pieces having second, third, fourth, etc., density may be separated in the different separation tanks 2-1, 2-2, 2-3. Also shown is a piping arrangement 16 and collecting tanks 18 for reuse of water and floating material.

Figure 8A:
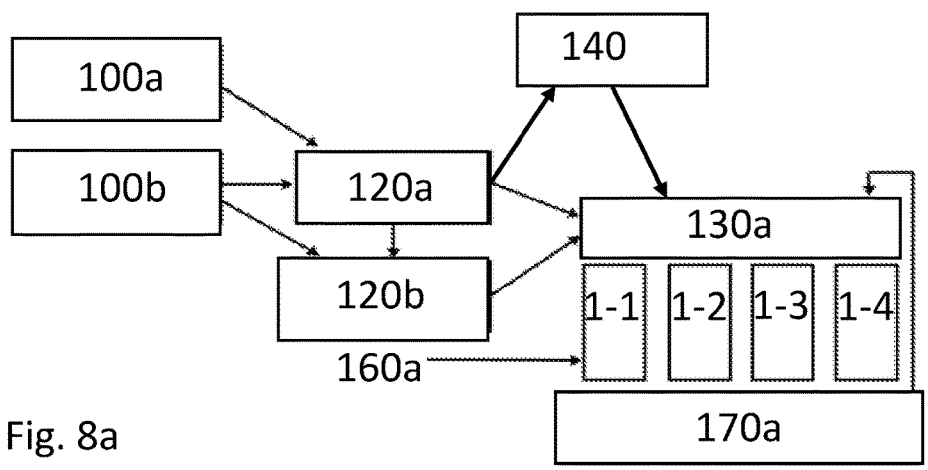
FIGS. 8a-b show flow diagrams of a method of the disclosure.
Figure 8B:
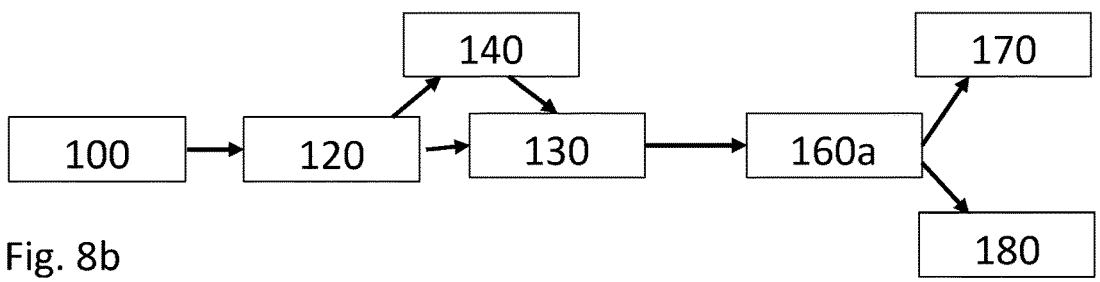

FIGS. 7 and 8a, 8b show a method for using the system of the disclosure. First the rough material is collected 100 at the mine or waste plant, which may be a rock 100a or alluvial material 100b and transported 110 to the crushing site 120a if needed, where the material is grinded or crushed and filtered 120 to obtain pieces of a smaller diameter that can be entered 130 into the separation tank 2 or upper tank 1 of the system of the disclosure. The crushing site or plant may process about 50 or 100 m³ of material per hour. The diameter of the filtered material may be between 0.01 and 50 mm, or between 0.1 and 25 mm, or between 1 and 10 mm. Different diameters may be used in different tanks 1a, 1b, 1c. The processed material may be stored in a depot 120b prior entering the system of the disclosure. Prior to entering the tank 1,2, the material may optionally first be washed and/or concentrated 140. The processed material may enter 130 the tank using an accumulation tank 130a. The material may enter the system through an outlet of the accumulation tank 140a at a flow rate of about between 0.2 and 2 m³/hour, or between 0.5 and 1.5 m³/hour, or between 0.75 and 1.25 m³/hour. Different flow rates may be used in different upper tanks 1a, 1b, 1c. By use of gravity and other parameters, such as size of upper tank in relation to separation tank and diameter ratios of the pipe inlet 4a versus outlet 4b and position and inclination of the wall of the upper tank, inclination of the pipe outlet, flow rate, etc., the slurry from the optionally present upper tank(s) flows 150 into the separation tank 2. The material is mixed with water and the floating material and will float towards the bottom of the upper tank. Different materials having different densities will flow at different rates towards the bottom of the upper tank 1. The flow rate through the pipe may be different for the different systems used and may be between about 25 and 400 m³/hour, or between 75 and 350 m³/hour, or between 100 and 300 m³/hour. The slurry will pass the separation tank(s) 160, where the heavy pieces are separated 160a from the slurry. The slurry with a reduced content of heavy pieces flows out of the separation tank, where it can be filtered and reused 170 in a re-use system 170a. The flow rate in the separation tank(s) is less than the flow rate in the pipe(s) and may be below 300, or 100, or 75, or 50, or 25 m³/hour. The pieces separated from the starting material can be collected 180 continuously during the use of the system.

The yield of the system is above 50%, or above 75%, or between 80 and 100%, or between 85 and 99.9%, or between 90 and 99.9%. The yield being the amount of pieces having a second density collected compared to the total number of pieces having a second density present in the slurry that enters the pipe 4.

Example 1

An example of the method will now be described using the system as shown in FIGS. 1 and 2.

Raw material comprising sand 8 and pieces of gold 9 at 3 grams of gold per 1000 kg or 3 g of fold per m³ of sand at a diameter of about 8 mm or less had been entered to the upper tank 1 at a rate of 1 m³/h. At the bottom 7 of the upper tank 1, the pressure on the slurry is increased and the slurry is pushed through the pipe 4. The flow rate in the pipe was measured at 100 and 300 m³/h. The valve 13 was used to vary the flow rate. The slurry passed through the pipe outlet 4b into the separation tank 2, where a tray 5 was positioned under the outlet 4b at the bottom of the separation tank. The slurry flew through the separation tank 2 and through the separation tank outlet 6. Gold was collected from the tray 5.

At a pipe flow rate of 100 m³/h, from 250 000 kg of granular material (sand and gold) 750 g of gold was collected in the tray per hour.

At a pipe flow rate of 300 m³/h, from 750 000 kg of granular material (sand and gold) 2250 g of gold was collected in the tray per hour.

99.99% of the gold was recovered using the system of the invention.

Example 2

In another example, the system of FIGS. 3a and 3b was used to perform the method.

In this experiment water was used as floating material 7. The granular material was a mixture of quartz stones 8 having a density of over 1 g/cm³ and iron particles 9 having a density of about 2.5 g/cm³. The ratio of densities is similar to the densities used in a system of sodium bentonite, sand and iron. The granular material was mixed with water and entered the tank at pipe inlet 4a. A flow of slurry was caused by gravity as shown in FIG. 3a.

The results show that all iron 9 is separated and settled to be collected in the tray and that all quartz stone 8 pass through the separation tank outlet.

Example 3

In a further example, the system as shown in FIG. 4 was used to perform the method. One batch of 2000 liters of a mixture of floating material (sodium bentonite) and water at a density of about 0.593 g/cm³ was stored in storage tank 22. The mixture was added to the upper tank 1 and mixed with 1000 liter of granular material containing sand and gravel at an average diameter between 0.1 and 5 mm into a slurry in the upper tank. The slurry was separated while flowing downwards and through the pipe 4 into the separation tank 2. After separation and settling of pieces having a second density in the tray 5, the liquid exits the separation tank through the separation tank outlet 6 to be collected into the collecting tank 23. In one aspect, the flow of liquid through the separation tank is 3000 liter per 10 minutes. Further separation of pieces having a third, fourth, etc. density occurs in the collecting tank. The rest product of pieces having a higher density than the floating material are collected at the outlet 27 of the collecting tank and transported 24 from the system. 95 liters per batch of water was added in the collecting tank 23 from the water tank 18a. 5 liter per batch of bentonite was added to the storage tank 22 from the floating material tank 18b. A pump 19 was used to pump the mixture of floating material and water from the collecting tank 23 to the storage tank 22.

95% of the mixture of floating material and water could be re-used/recycled. The yield was 100% for pieces having a second density. Further, the pieces of third, fourth, etc., densities are also separated from the granular material at the outlet 27 of the collecting tank 23 and transported to be further processed.

| Reference list: | |
| --- | --- |
| Reference number | Feature |
| 1 | Upper tank |
| 2a - d | Separation tank |
| 3a, 3b, 3c | Channel |
| 4 | Pipe |
| 4a | Pipe inlet |
| 4b | Pipe outlet |
| 5 | Trap/Tray |
| 6 | Separation tank outlet |
| 7 | Bottom of separation tank |
| 8a-c | Separation chamber |
| 9c | Pieces having a second density |
| 9a | Floating material |
| 9b | Granular material/Sand |
| 10 | Top upper tank |
| 11 | Bottom upper tank |
| 12, 12b, 12c | First, third and fourth side wall of the separation tank |
| 13 | Valve |
| 14 | Second side wall separation tank |
| 15 | Opening member |
| 16 | Piping arrangement |
| 17 | Filtering member |
| 18 | Collecting tank |
| 18a | Water tank |
| 18b | Floating material tank |
| 19 | Pump |
| 20 | Inspection opening |
| 21 | Slurry pipe |
| 22 | Storage for mix of floating material and water |
| 23 | Collecting tank |
| 24 | Transport |
| 25, 25a | First partition wall |
| 25b | Second partition wall |
| 27 | outlet of collecting tank |
| 28 | Chamber between partition walls 25a-b |
| 100 | Collecting granular material |
| 100a | Rocky mine |
| 100b | Alluvial mine |
| 100 | Collecting |
| 110 | Transporting |
| 120 | Filtering/processing |
| 120a | Crossing site |
| 120b | Depot |
| 130 | Entering granular material into upper tank |
| 130a | Accumulating tank |
| 140 | Concentrating |
| 26 | Opening between partition wall and bottom |
| 140a | Outlet of accumulation tank |
| 150 | Flow through pipe |
| 160 | Flow through separation tank |
| 160a | Separation in separation tank |
| 161 | Flow inside upper tank |
| 162 | Flow into separation tank |
| 163 | Turbulence flow in separation tank |
| 164 | Flow out of separation tank |
| 165 | Flow from separation tank outlet |
| 170 | Reuse of floating material and water |
| 170a | Re-use system |
| 180 | Collection metal |
| α | Angle between side wall and partition wall |
| β | Angle side wall upper tank with central axis |
| L1 | Central axis of upper tank |
| L2 | Central axis separation tank |
| h | Distance between pipe outlet and tank outlet |
| d | Distance between pipe outlet and bottom of the separation tank |

The invention claimed is:

1. A system for separating pieces having a second density from granular material, including a separation tank comprising:
a first side wall provided with a tank outlet,
a bottom,
a pipe defining a channel for allowing a slurry of water, a floating material having a first density, which is less than the second density, granular material and the pieces having the second density, to flow into the separation tank, wherein the pipe has a pipe outlet spaced apart from the tank outlet in a horizontal and vertical direction, and the tank outlet is arranged above the pipe outlet in a vertical direction,
a separation chamber including the tank outlet and arranged in liquid communication with the pipe outlet, and
a trap for collecting pieces having the second density, arranged at the bottom of the tank,
wherein the pipe outlet is positioned in a lower third of the separation tank, and the pipe outlet is facing the bottom of the separation tank so that the slurry flows through the pipe outlet towards the bottom in a substantially vertical direction to cause a turbulent flow of the slurry in the separation tank,
wherein the separation tank comprises at least one partition wall disposed between the channel and the separation chamber, and there is at least one opening between a lower end of the at least one partition wall and the bottom to allow the slurry to enter the separation chamber from the pipe outlet.

2. The system according to claim 1, wherein a vertical distance (h) between the pipe outlet and the tank outlet is at least three times a vertical distance (d) between the bottom of the separation tank and the pipe outlet.

3. The system according claim 1, wherein the separation chamber is tapered towards the tank outlet.

4. The system according claim 1, wherein the channel is tapered towards the pipe outlet.

5. The system according to claim 1, wherein said at least one partition wall comprises a first partition wall, said separation chamber is arranged between the first partition wall, the first side wall, and the bottom of the separation tank, and the first partition wall is inclined with respect to the first side wall so that the separation chamber is tapering towards the tank outlet.

6. The system according to claim 5, wherein the separation tank comprises a second side wall opposite the first side wall, said at least one partition wall comprises a second partition wall arranged between the first partition wall and the second side wall to form said pipe, and said channel is arranged between the second side wall and the second partition wall.

7. The system according to claim 6, wherein the second partition wall is inclined with respect to the second side wall so that the channel is tapering towards the pipe outlet.

8. The system according claim 1, wherein the system comprises an upper tank for housing the slurry, the separation tank being arranged at least partly below the upper tank in a vertical direction so that the bottom of the separation tank is located below a bottom of the upper tank, said pipe is arranged between the upper tank and the separation tank to allow the slurry to flow from the upper tank to the separation tank.

9. The system according to claim 8 comprising:
a collecting tank arranged in liquid communication with the separation tank, whereby the collecting tank has an outlet for transporting the liquid from the system,
a storage tank for storage of a mixture of floating material and water and arranged in liquid communication with the collecting tank and the upper tank,
a pump arranged for transport of liquid from the collecting tank to said storage tank,
a floating material tank arranged in liquid communication with the storage tank for storing floating material and adding floating material to said storage tank, and
a water tank arranged in liquid communication with the collecting tank for storing water and adding water to the collecting tank.

10. The system according claim 1, wherein the trap is removable from the separation tank.

11. The system according claim 10, wherein the trap is a tray for collecting pieces having a second density arranged at least partly below the outlet of the pipe.

12. The system of claim 1, wherein the vertical distance (h) between the pipe outlet and the tank outlet is at least four times the vertical distance (d) between the bottom of the separation tank and the pipe outlet.

13. The system of claim 1, wherein pipe is substantially vertical before the pipe outlet for a distance at least as great as the space between the pipe outlet and the tank outlet in the vertical direction.

14. A system for separating pieces having a second density from granular material, including a separation tank comprising:
a first side wall provided with a tank outlet,
a bottom,
a pipe defining a channel for allowing a slurry of water, a floating material having a first density, which is less than the second density, granular material and the pieces having the second density, to flow into the separation tank, wherein the pipe has a pipe outlet spaced apart from the tank outlet in a horizontal and vertical direction, and the tank outlet is arranged above the pipe outlet in a vertical direction,
a separation chamber including the tank outlet and arranged in liquid communication with the pipe outlet, and
a trap for collecting pieces having the second density, arranged at the bottom of the tank,
wherein the pipe outlet is positioned in a lower third of the separation tank, and the pipe outlet is facing the bottom of the separation tank so that the slurry flows through the pipe outlet towards the bottom in a substantially vertical direction to cause a turbulent flow of the slurry in the separation tank,
wherein a vertical distance (h) between the pipe outlet and the tank outlet is at least three times a vertical distance (d) between the bottom of the separation tank and the pipe outlet.

15. The system according claim 14, wherein the separation chamber is tapered towards the tank outlet.

16. The system according claim 14, wherein the channel is tapered towards the pipe outlet.

* * * * *